(No Model.) 3 Sheets—Sheet 1.

H. FAIRBANKS & W. H. SARGENT.
SCALE.

No. 597,641. Patented Jan. 18, 1898.

WITNESSES: INVENTORS
Henry Fairbanks.
Willis H. Sargent.

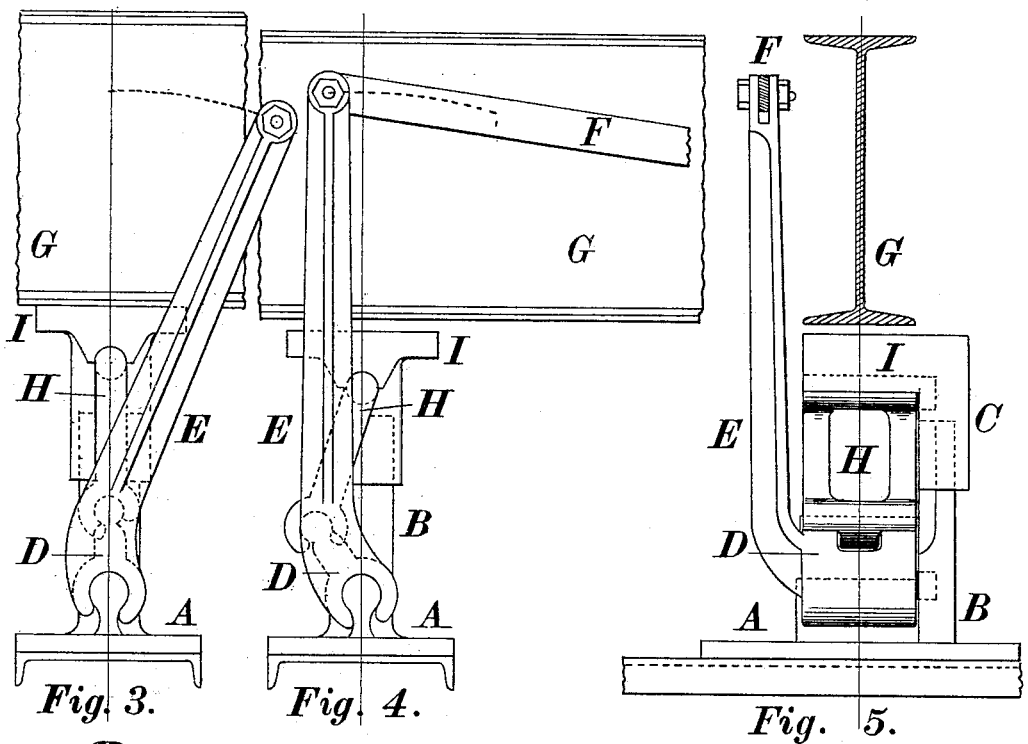
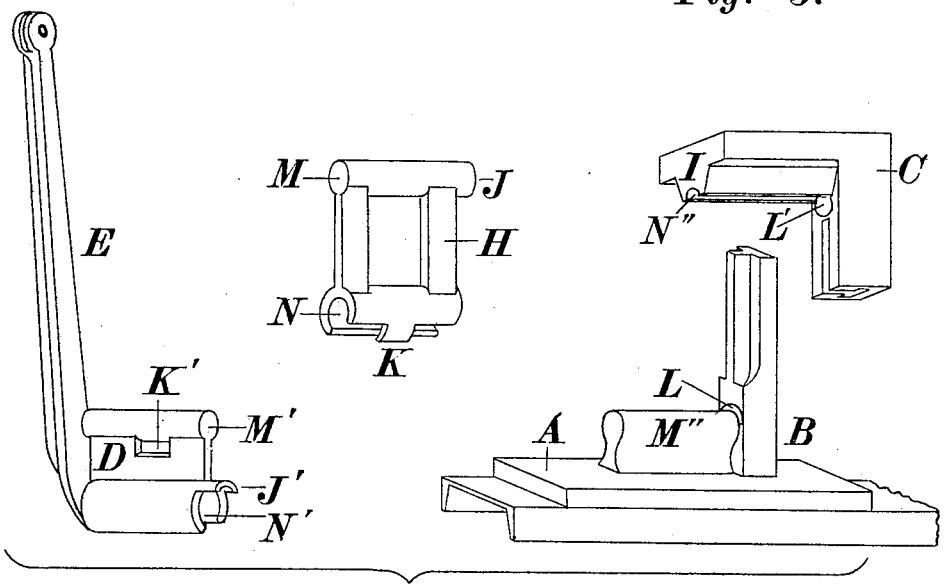

(No Model.) 3 Sheets—Sheet 3.

H. FAIRBANKS & W. H. SARGENT.
SCALE.

No. 597,641. Patented Jan. 18, 1898.

UNITED STATES PATENT OFFICE.

HENRY FAIRBANKS AND WILLIS H. SARGENT, OF ST. JOHNSBURY, VERMONT, ASSIGNORS TO THE E. & T. FAIRBANKS & COMPANY, OF SAME PLACE.

SCALE.

SPECIFICATION forming part of Letters Patent No. 597,641, dated January 18, 1898.

Application filed April 27, 1897. Serial No. 634,115. (No model.)

*To all whom it may concern:*

Be it known that we, HENRY FAIRBANKS and WILLIS H. SARGENT, citizens of the United States, residing at St. Johnsbury, in the county of Caledonia, State of Vermont, have invented certain new and useful Improvements in Scales, of which the following is a description, reference being had to the accompanying drawings and to the letters of reference marked thereon.

Our invention relates to an improvement in platform-scales, and particularly to railroad-track scales or scales of similar character which are arranged in such position that railroad-cars or heavily-loaded wagons may be run upon them and be weighed and then moved off.

It is the special object of this invention to provide a relieving-gear for such scales, whereby the platform may be lifted off its pivots and supported in such position as to allow traffic which is not to be weighed to pass over the scale without wearing the pivot edges.

The invention consists in a novel construction of relieving-gear, the features of which will be described hereinafter and pointed out in the appended claims, and also in a novel construction of buffer arrangement to prevent the platform-rails being struck with too great a shock by the locomotive when running over the scale.

The invention is illustrated in the accompanying drawings, in which—

Figure 1:
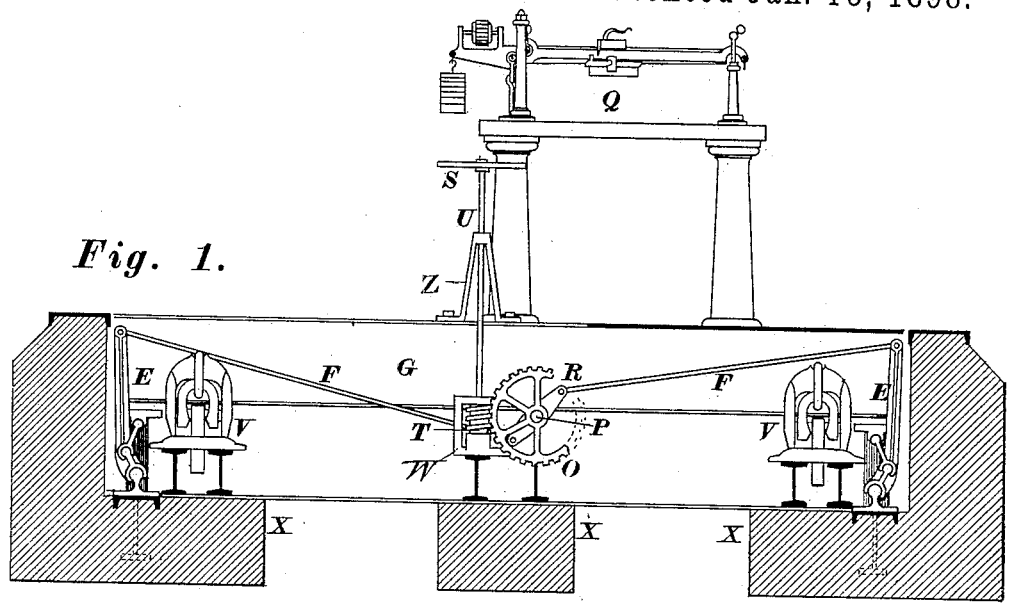
Figure 2:
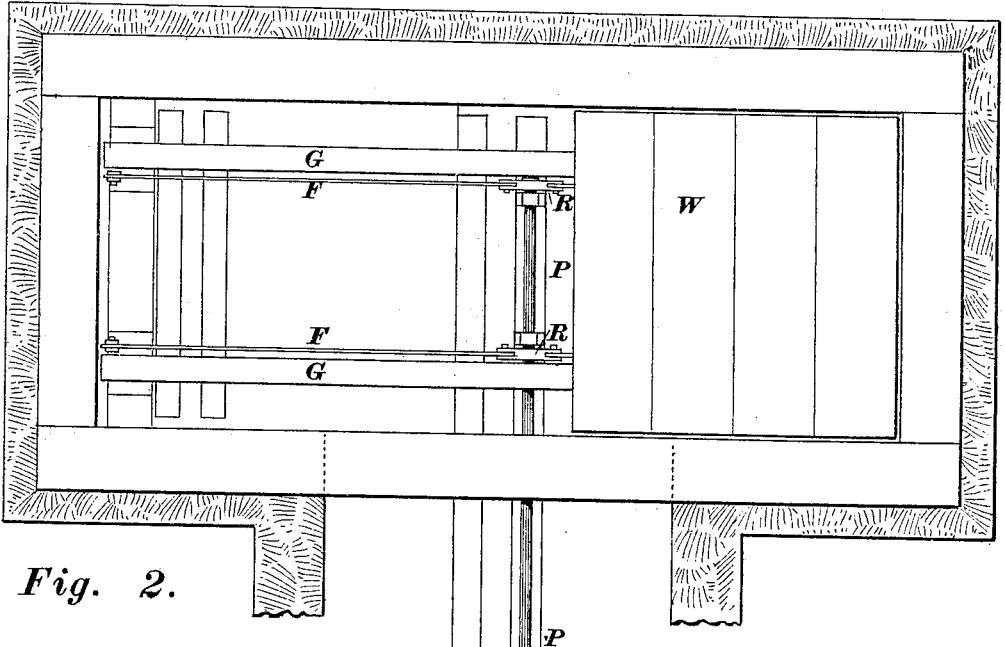
Figure 7:
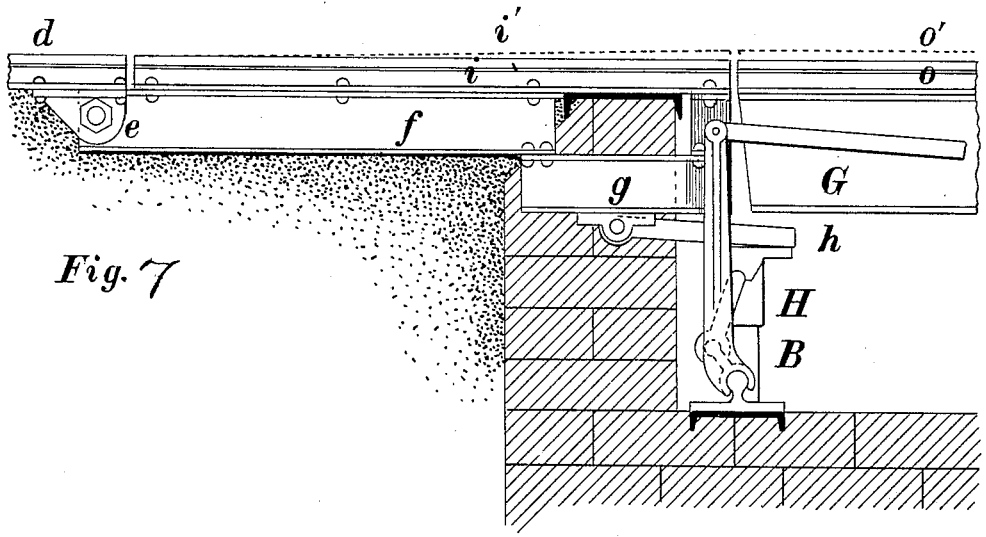
Figure 8:
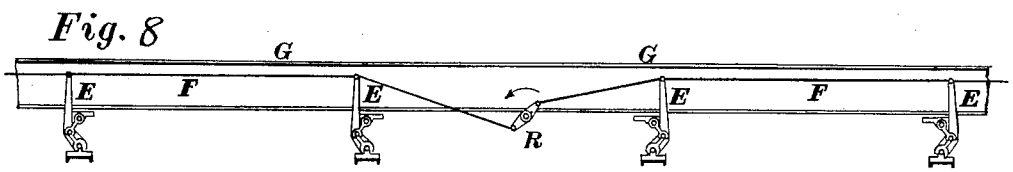

Figure 1 is a front elevation, partly in section, of a platform-scale embodying our invention. Fig. 2 is a top plan view of the invention. Figs. 3 and 4 are elevations of the links and upright levers. Fig. 5 is a side elevation of the same. Fig. 6 represents detached detail views of the various parts. Fig. 7 is a view showing a form of buffer which forms a part of the present invention; and Fig. 8 is a side view showing the application of four pairs of jacks to relieve the different bearings of a long scale.

In the drawings, X represents the surrounding and supporting coping or timbers upon which the parts of the scale are supported.

V represents as a whole the pivots and hangers upon which the platform is supported.

Q represents the scale-beam and supporting-standards, which are of a well-known construction.

A is a suitable base or standard which is secured upon either side in the foundation of the scale, and it is provided with the upright post B, cut out for some distance below its upper end to form a T-iron. C is an angle-iron formed on its downwardly-projecting end with a T-groove, which fits over the T on the post B and slides up and down thereon. This base-piece A is provided with a rounded rib M″, while adjacent the upper surface of this rib the post B is provided with a crescent-shaped slot L.

D represents the lower link, which has the upwardly-extending integral arm E, this link being rounded at its lower end and formed with a rounded groove N′, which slides upon the rib M″ and has an oscillating movement thereon, said link D having a tongue or lip J′, which fits in the crescent-shaped slot L. The link D is provided at its upper part with a rib M′ and has below the rib a slot K′.

H represents the upper link, which at its lower end is enlarged and rounded and provided with a rounded groove N, which fits upon and has pivotal movement on the rib M′, said link H having a tongue K, adapted when in position to fit within the slot K′. At its upper end the link H has a rounded rib, and the horizontal portion I of the angle-plate C has a downwardly-extending rib with a groove N″, which receives the rib M. The rib M has a projecting portion J, which when the parts are slid into position enters the hole L′, formed in the angle-plate C. The platform I-beams G of the scale are normally above the angle-piece C; but when the lever E is moved out of the perpendicular and the links D and H straightened the angle-plate C is lifted, sliding on the T-post B, and the part I comes up against the beams G, and as there is one of these devices at each corner of the scale the platform of the latter is lifted off its pivots, thus withdrawing the strain therefrom. As a means for simultaneously operating these links to raise and lower the platform we provide the means shown in Figs. 1 and 2. Referring now to these figures, S represents a hand-wheel upon the top of a vertical shaft U, which has a bearing in the frame Z, said shaft U projecting downward below the plane of the platform and having a bearing at its lower end in the bracket W, which is supported on I-beams. At its lower end this shaft U is provided with a worm, which meshes with the teeth of the gear-wheel O, this gear-wheel O being mounted on the shaft P, which is supported in bearings in its opposite ends and, if desired, midway of its length, too. Attached to this shaft P are two sets of arms R, each set being in engagement with two rods F, which at their opposite ends are pivoted to the upper end of the lever E. It will therefore be seen that by turning the hand-wheel the arms R will be oscillated back and forth through the medium of the worm-gear and worm-wheel and the links D H straightened or broken at the joints.

The parts of the platform jack or relieving-gear are constructed to be put together with little fitting, all the bearings being cast into the proper shape and, in brief, the jack is set up in the following manner: The groove N' in the lower link D slides endwise onto the rib M'' on the base A and the tongue J' enters the crescent-shaped opening L. The upper link H is then placed in position, the tongue K entering the slot K'. The cap C drops down over the post B and the groove N'' rests on the bearing M. The portion J is then pushed into the hole L' and the device for each corner is then a complete structure, as shown in Fig. 5. The cap cannot be lifted off, being held by the portions J, J', and K, neither can it "hang up" if it binds so that its own weight is not sufficient to bring it down.

While we have described a worm-gear and wheel for operating the oscillating shaft, and through it the jacks, and have made claims for this special operating means, it will be understood that we do not wish to be limited to this special form of operating means, as others may be devised.

While in the former part of this specification we have described the use of four jacks, which of course are sufficient to carry a platform which can be supported from the four corners, it will be understood that longer platforms, as of four or six section track-scales, must have a jack to support each end of each I-beam or other "platform-stick," so that four or six pairs of jacks may be required to relieve the different bearings of a long scale. Such a scale is shown in Fig. 8.

Since the platform when raised off its bearings is so much higher than when resting on the knife-edges, there is danger of injury to the scales and platform-rails of a track-scale when the locomotive strikes the end of the platform-rails, and to avoid this we have shown in the drawings a device known as the "Merrill buffer," as illustrated in Patent No. 283,632. As a further and special improvement in devices of this kind, however, we have invented a special form of device for this purpose, as shown in Fig. 7. In this figure $f$ represents a swinging support for that portion of the railroad-track adjacent the scale-platform, this support $f$ being hinged at $e$. To the end of this support $f$, adjacent the platform, is attached a beam $g$, to which is hinged a piece $h$, which extends across within the plane of the scale between the jack and the I-beam G. By this arrangement when the toggle-links of the platform-jack are straightened not only is the platform raised off its pivots, but through the medium of the swinging piece $h$ the track-rails adjacent the scale are raised just as much as the track-rails on the scale.

Having thus described our invention, what we claim, and desire to secure by Letters Patent, is—

1. A platform relieving-gear for scales comprising toggle-links adapted to be supported beneath the platform and means for operating said toggle-links, comprising levers operatively connected to said toggle-links, an oscillating shaft, a worm-wheel on said shaft, a worm-gear meshing with said wheel and connections between the oscillating shaft and the operating-levers, substantially as described.

2. A platform relieving-gear for scales, comprising toggle-links adapted to be supported beneath the platform and means for operating said toggle-links, comprising levers operatively connected to said toggle-links, an oscillating shaft, a worm-wheel on said shaft, a worm-gear meshing with said wheel, a vertical shaft upon which said worm-gear is supported and means for operating said vertical shaft, substantially as described.

3. A platform relieving-gear, comprising toggle-jacks for elevating the platform above its pivots, and means for operating said jacks comprising levers operatively connected thereto, an oscillating horizontal shaft, a worm-wheel thereon, connections between the shaft and the levers, a vertically-arranged shaft carrying a worm-gear in mesh with the worm-wheel and means for operating the vertical shaft, substantially as described.

4. In a platform relieving-gear, the herein-described means for operating the levers or links which bear on the platform to raise it off its pivots, comprising an oscillating shaft having a worm-wheel thereon, radial arms on said shaft and a vertical worm-gear in mesh with the worm-wheel, means for operating said worm-gear and connection between the radial arms and the levers, or links, substantially as described.

5. In a relieving-gear in combination with the levers adapted to operate on the under side of the platform for raising the same from its pivots, a bracket as W supported on the scale-foundation, a horizontal shaft journaled at one end in an extension of said bracket and having a worm-wheel and radial arms, a vertical shaft provided with a worm-gear and journaled at its lower end in said bracket with connections between the radial arms and the levers or links, just above mentioned, substantially as described.

6. In a relieving-gear, upper and lower toggle-links, one of which is provided with an upwardly-extending arm, a vertical sliding piece in engagement with the other and adapted when elevated to operate on the under side of the scale-platform, substantially as described.

7. In a relieving-gear, toggle-links, the lower one of which is pivoted to the frame and has an upwardly-extending arm, a second link pivotally supported on the first link and at its upper end supporting pivotally a sliding part which is adapted to engage the under side of the platform, substantially as described.

8. In a relieving-gear, the toggle-link D having a rounded lower part pivoted on the frame and having an integral upwardly-extending arm, as E, and having a rounded portion as M', a second link having a lower rounded portion provided with a groove fitting over the part M' and at its upper end pivotally connected with a vertical sliding piece adapted to be brought into engagement with the under side of the platform, substantially as described.

9. In a relieving-gear, the base-piece provided with a rib M" and the upwardly-extending post B, the angle-piece C sliding on said post and the toggle-links D H pivoted together and to the rib M", and the angle-piece C with means for operating said toggle-links, substantially as described.

10. In a jack the base-piece provided with the rib M", the upwardly-extending post B and having the groove L in the same adjacent the rib M", the link D having the groove embracing the rib M" and having a tongue fitting in the slot L, said link D having the slot K' and the rib M', the link H having a lower portion pivoted on the rib M' and having a tongue K fitting the slot K' and having a curved rib on its upper end provided with a projection J and an angle-piece sliding on the post B and having a groove resting on the rib M and provided with a slot L' to receive the projection J with means for straightening and crooking said toggle-links, substantially as described.

11. In a railroad-track scale, vertically-movable track-rails adjacent the scale-platform, a relieving-gear comprising jacks for elevating the scale-platform and connections between one or more of said jacks and the movable rail-support, whereby the latter is elevated simultaneously with the elevation of the platform, substantially as described.

12. In a railroad-track scale, a hinged support, a track-rail on said support, jacks beneath the scale-platform and connections between the jack and the rail-support whereby the platform and the rail-support are elevated simultaneously, substantially as described.

13. In a railroad-track scale, a hinged support, a track-rail on said support, jacks beneath the scale-platform and a swinging section adapted when the jack is operated to bear on the under side of the platform and also on the under side of the swinging rail-support, substantially as described.

14. In a railroad-track scale, a hinged support, a track-rail on said support, jacks beneath the scale-platform and a swinging lever h pivoted at one end to the swinging rail-support and normally bearing at its other end upon the jack, substantially as described.

15. In a railroad-track scale, a support for the section of track adjacent the platform of the scale comprising a hinged section f, a section g depending therefrom and substantially in the same plane as the platform-beams of the scale and a lever hinged to the part g and normally bearing on a platform-jack, substantially as described.

16. In a relieving-gear, toggle-links and means for operating them, a part operated thereby upon which the platform rests while being raised and lowered, and a guide for said part independent of the toggles; substantially as described.

In testimony whereof we affix our signatures in presence of two witnesses.

HENRY FAIRBANKS.
WILLIS H. SARGENT.

Witnesses:
J. C. CLARK,
H. W. BROOKS.